United States Patent
Baldwin et al.

(10) Patent No.: US 6,607,670 B2
(45) Date of Patent: Aug. 19, 2003

(54) PROCESS FOR RAPID COLLOIDAL SUSPENSION REMOVAL

(75) Inventors: Philip N. Baldwin, Colorado Springs, CO (US); Raymond E. Beatty, Lynchburg, VA (US); James E. Day, Manassas, VA (US); Gary J. Guy, Jackson, SC (US)

(73) Assignee: Framatome Anp. Inc., Lynchburg, VA (US)

( * ) Notice: Subject to any disclaimer, the term of this patent is extended or adjusted under 35 U.S.C. 154(b) by 0 days.

(21) Appl. No.: 09/834,536

(22) Filed: Apr. 13, 2001

(65) Prior Publication Data

US 2003/0111422 A1 Jun. 19, 2003

Related U.S. Application Data

(60) Provisional application No. 60/197,346, filed on Apr. 14, 2000.

(51) Int. Cl.$^7$ .................................................. C02F 1/56
(52) U.S. Cl. ........................ 210/714; 210/725; 210/727; 210/778; 210/793; 451/36; 451/88
(58) Field of Search ................... 210/712, 714, 210/725, 727, 728, 734, 735, 778, 793; 451/36, 87, 88

(56) References Cited

U.S. PATENT DOCUMENTS

| | | | | |
|---|---|---|---|---|
| 3,128,249 A | * | 4/1964 | Pye | 210/727 |
| 3,235,492 A | * | 2/1966 | Andresen et al. | 210/193 |
| 4,280,913 A | * | 7/1981 | Applegate et al. | 210/669 |
| 4,872,975 A | * | 10/1989 | Benson | 210/104 |
| 4,872,993 A | * | 10/1989 | Harrison | 210/666 |
| 5,325,605 A | * | 7/1994 | Carew | 110/186 |
| 5,637,029 A | * | 6/1997 | Lehane | 451/39 |
| 5,858,231 A | * | 1/1999 | Drori | 210/411 |
| 6,001,265 A | * | 12/1999 | Toyama et al. | 209/5 |
| 6,156,194 A | * | 12/2000 | Lamoureux | 210/172 |

* cited by examiner

Primary Examiner—Peter A. Hruskoci
(74) Attorney, Agent, or Firm—Vytas R. Matas

(57) ABSTRACT

A method and apparatus is disclosed for very rapidly cleaning very small, colloidal particles from nuclear reactor water subjected to a high-energy waterjet cutting of metal using metal shot particles for cuffing such as garnet particles with the cutting causing fracturing of the metal shot as well as the cut metal fines into a negatively charged colloidal suspension having a large area. This colloidal suspension causes water turbidity and makes known filtration techniques impractical for rapid removal of such suspensions for recycling to the reactor.

11 Claims, 2 Drawing Sheets

PROCESS FOR RAPID COLLOIDAL SUSPENSION REMOVAL

This application claims the benefit of provisional application Ser. No. 60/197,346 filed Apr. 14, 2000.

BACKGROUND OF THE INVENTION

1. Field of the Invention

The present invention generally relates to methods and apparatus for separating water borne residuals created during the high pressure waterjet cutting of material in nuclear reactors and more particularly to a rapid process for continuously and rapidly removing same when using particulate matter in the Waterjet cutting such as garnet.

2. Description of the Prior Art

The waterjet cutting process when used in nuclear reactors uses an approximately 50,000 psi water stream which includes a small amount of particulate shot material such as garnet pellets to assist in the waterjet cut through the stainless steel or any other metal encountered in the reactor. Garnet is a form of silicate with traces of iron, aluminum as well as other possible trace elements such as chrome, magnesium, calcium, manganese and titanium. The typical chemical formula for garnet is: $A_3B_2(SiO_4)_3$, where A=iron, manganese, calcium or magnesium and B represents elements such as aluminum, iron, chromium or titanium. The waterjet garnet is substantially fractured by the high-pressure impact of the garnet on the cut stainless steel of the reactor. This results in a variety of particle sizes from less than 1 micron to about 300 microns.

Due to the high energy fracturing of the garnet during the waterjet cutting the creation of very small colloidal particles of garnet was seen. This is true for other particles used in Waterjet cutting such as stainless steel and others, although the amount of such created colloids may change. During this process $Si(OH)_4$ is created which, due to its chemistry (and the approximate neutral carrying water) the presence of charged hydroxyl complexes such as: $(HO)_3$ SiO are allowed. These bear a negative charge. This negative charge is a universal problem when particle removal from water is desired. Further, the creation of other typical very small colloidal particles of less than 10 microns that may have a variety of SiOx structures will also bear a negative net charge. Colloids are any particles, by definition, between about 0.005 and 10 microns in size, regardless of their chemical or biological composition.

A universal property of water borne colloidal silica, in neutral to near neutral pHs, is that they will bear a negative charge. This negative charge, combined with the small size creates a substantial particle removal problem.

Although colloidal particles are small, they have a very large surface area which permits the colloid to scatter light far beyond what might be suggested by its mass. The surface area value for the "typical particle" is in the range of 250–350 square meters per gram. This results in a very, very low quantity of colloidal silica causing significant turbidity (light scatter and failure to pass light) in any colloidally contaminated water. It has been found that the waterjet process water even when filtered through a 1 micro filter will still absorb over 98% of 400 nano-meter light at a distance of 5 feet in depth.

Another feature of the small mass of each colloid particle is that its electric charge (negative) to its mass is quite high. This high charge allows colloidal particles to repel other particles vigorously and, hence, hinders efficient removal or filtration or centrifuging (hydro cyclones, cyclone separators and centrifuges).

The negative charge is measured in a known manner using a Zeta potential meter. Typical waterjet cutting polluted reactor water was tested to have a value of between minus 20 and minus 40. An acceptable value for treated and filtered water is minus 5 to plus five as published by the Zeta meter manufacturer.

When "un-charge neutralized" colloidal particles are trapped in or on a filtering surface, the repulsion energy grows quickly. The net result is that the filtering surface is quickly "plugged" with a very low mass, but which mass also has a high repulsion energy to the acceptance of any more negatively charged mass in the water. Also, some colloidal particles, which remain uncharged or are neutralized, will not be filtered out at all, even with a 0.5 micro filter, and will pass into the filtrate causing turbidity.

When untreated colloidal particle filtration continues for a brief time, the bulk of the suspended mass in the water, which is non charged, cannot be efficiently filtered from the water due to premature filter plugging by the negatively charged colloidal particles. Experiments showed that process water that was even first passed through a cyclone separation continued to rapidly plug down field 3M filters of both 3 micron and 1 micron. This is due to the retained colloids and negative Zeta potential of the water.

The problem is further exasperated by the fact that the spent cutting water from the reactor also contains metal fines or what is referred to as swarf. None of these particles are colloidal. But, a very small amount is fractured by the waterjet process into a colloidal state. This occurs because about 0% of the suspended_stainless swarf, by weight, is fractured so vigorously into small particles that the chromium and nickel from the steel is forced into solution. Colloidal particles of metal are likely to be in a hydrated form similar to the hydrated/ionized silica and hence would contribute to the negative repulsion of the spent water stream.

This generation of fractured garnet and metal particles, during waterjet cutting in nuclear reactors that are less than 1 micron is size creates a huge problem in that prior art normal filtration is seriously hindered. In order to remove these very small particles, a very fine filter is required even though the overwhelming mass of the residuals are large enough to be trapped by a relatively high capacity corrugated depth filter such as a 2–10 micro fabric or a paper filter.

The very fine particles require fine filters, which by definition have a far lower capacity than a crasser filter. The use of fine filters leads to a very high generation of filter body waste, all of which will also be highly radioactive and thus extremely costly to dispose of.

The very fine, colloidal, particles further retard typical filtration because they are very negatively charged, repelling each other, leading to even a faster decline in filtering capacity and yet producing an even higher quantity of "dead" filters. This phenomena was confirmed through testing. During testing, fine filters were clogged in less than ten minutes with a fraction of the solids loading normally observed. Thus it was seen that the particle distribution for the whole body of total suspended waterjet particles in the process water, being from less than 1 micron to about 300 microns, is in a range that is totally unsuitable for mechanical separation with any level of efficiency.

It should be noted that during our testing, untreated process water was subjected to both a Krebs hydro cyclone and a Lykos liquid solids separator. Neither method could provide a removal efficiency, on average, of even 50%. This was due to the small negatively charged particles and the large negative Zeta potential of the water. Treatment of the waste water prior to mechanical separator treatment indicated some potential in substantially improving this mechanical method, but with treatment costs included, other methods of residual removal indicated much less expensive potential.

All the mentioned treatment systems were slow and inefficient and totally inappropriate to meet the needs for rapid removal of the pollutants within less than a minute and preferably within seconds.

In order to rapidly remove the waterjet residuals from the process water within the mentioned time factors, some form of traditional pre-filtration chemical treatment seemed to be required.

Properly treated nuclear reactor water needs a treatment and collection system, which will rapidly (within seconds) achieve the following required points:

a bulk solids in water separation efficiency of 98%+ the addition of any treatment solids requires minimization high radioactivity due to the metal swarf needs a robust treatment system that will function under water the process treatment system has to function at 1,000 gallons per minute.

the space available for treatment equipment is very restricted.

To achieve these goals mechanical separation techniques were evaluated but were found completely unsatisfactory.

The known mechanical technology used to remove turbidity and color from waters of all kinds has been established in the United States since early in the twentieth century. While there are a variety of approaches they all involve some variation of the following steps:

Coagulation

Flocculation

Sedimentation or Settling

Final Filtering.

These techniques are defined as follows:

Coagulation is the process of removing the negative, repulsive charge on the smallest particles that create the turbidity and filtering problems of premature filter clogging. Classically, this is done with either +3 charged aluminum or plus 3 charged iron salts. In more recent times, in circumstance the will allow for the extra cost, or where low turbidity exits, organic cationic polymers are used to reduce the negative charge (Zeta potential) of the water. Once the charge has been removed, the very small particles can begin to agglomerate into larger particles. This aids direct filtration as well as settling.

Flocculation aids the pace at which the very small charge neutralized particles will clump into bigger particles, large organic molecules called flocculants are used. There a great many of them and some work better than others on any particular water. These agents bridge between particles aiding in more rapidly getting them into filterable, settleable sizes.

Settling is defined as the time it takes to adequately coagulate and flocculate water in order for it to self-settle into clear treated decantable water is hours, days or even weeks. However, in cases where there is not sufficient room to store large quantities of treated water, awaiting settling to clarity, filtration is used after a period of reaction between the coagulants, flocculants and the waste water. Depending upon the level of turbidity, this period is widely considered to, be between ~15 minutes and several hours.

Water that has been treated by the previous steps can be readily filtered. This is typically done using rotary vacuum filters with blade scrappers or plate and frame pressure filters. Very slightly turbid water may, in some instances, simply be treated using sand and granular activated carbon (GAC) back-washable filters. Highly turbid waters are seldom if ever final filtered in this way.

Because of the reasons presented above, simple, direct filtration of highly charged water, such as the waterjet water, does not work from a practical point of view. Experience at the Framatome Mill Ridge testing facility during 1999 proved this point. Even filtration using some fine filter precoating did not work. These results are anticipated by the nature of the waterjet process and the resultant water quality, which by American Water Works Association falls into the highest class of 3 classes of turbid water.

Certain U.S. Patents teach processes for treating reactor water. These patents are as follows:

U.S. Pat. No. 6,156,194 teaches a method of treating reactor water that is contaminated with both radioactive metal cutting fines that come from the reactor and non-radioactive waterjet cutting particles that come from the waterjet cutting process.

The separation method taught is to magnetically filter the magnetic metal cuttings from the non-magnetic garnet waterjet particles to thus separate the two and subject the two streams to filtration that can produce recyclable reactor water.

This patent does not address the problems posed by colloidal particles produced by the garnet particle waterjet process and there is no indication therein that this process can rapidly remove these particles within seconds.

U.S. Pat. No. 5,637,029 teaches a method of recovering desired size abrasive shot material from a slurry recovered from a liquid—abrasive blast cleaner apparatus. The slurry is filtered for different size shot to recover usable materials.

Again, this patent does not address the problems posed by colloidal particles produced by the garnet particle waterjet process and there is no indication therein that this process can rapidly remove these particles within seconds.

A careful review of both of the above patents shows that it is known to remove the metal cuttings and garnet from the water in a reactor in which a waterjet cutting operation using garnet was used. However, the known removal method uses magnetic filters to separate the metal cuttings from the garnet particles. A filtration of the water slurry for collecting desired size particles is also shown. However, none of these patents recognize the problem of rapidly treating, within seconds, colloidal, negatively charged particles of both particles such as garnet and metal cuttings, swarf, to provide clean turbidity free recyclable reactor water, Also, the processes described therein do not teach any systems that will optimally remove the negative charge on the colloidal suspensions nor any optimized chemicals and their composition to flocculate them into larger particles making a special mechanical filtration feasible.

Thus a rapid process for processing water from a nuclear reactor contaminated by waterjet particles such as garnet particles and metal cuttings formed as colloidal suspensions of metal cutting particles and swarf to an acceptably clean level within seconds was sorely needed.

SUMMARY OF THE INVENTION

The present invention solves the problems associated with prior art processes and others by providing a rapid method and apparatus for cleaning very small colloidal material from the abrasive material used in waterjet cutting (such as garnet) and metal particles from a cut reactor section. Both are found in the reactor water after a high-energy waterjet cutting of metal such as stainless steel using abrasive shot cutting particles such as garnet particles. All abrasive shot materials will yield some colloidal suspension. The high energy of the waterjet cutting process causes fracturing of the abrasive material as well as the cut metal fines producing a negatively charged colloidal suspension having a large area. This colloidal suspension causes water turbidity and makes normal filtration techniques impractical.

To clean the reactor water effectively and rapidly, a process was optimized to draw turbid water from a reactor, which had been subjected to garnet waterjet cutting. This water was first subjected to a Zeta treatment followed by the addition of coagulants and flocculants. The treated water was then sent to a filtering tank to which a precoat was added and which separates the solids from the clean liquid and sends the liquid to a secondary filtration station from which clean water which is Zeta adjusted and which has all colloidals removed may be recycled to the reactor.

In view of the foregoing it will be seen that one aspect of the present invention is to provide a method of very rapidly treating reactor water having waterjet cutting colloidal particles.

Another aspect is to provide a method of removing colloidal cutting particles such as garnet and metal cutting swarf from reactor water.

Yet another aspect is to provide an optimized reactor water treatment process using specific filtration and filter precoat techniques.

Still yet another aspect is to provide an optimized reactor water treatment process using specific negative charge removal and flocculants techniques.

Still yet another aspect of the present invention is to provide a method of treating reactor water having waterjet cutting colloidal particles within seconds.

These and other aspects of the present invention will be more fully understood upon a review of the following description of the preferred embodiment when considered in conjunction with the drawings.

DESCRIPTION OF THE PREFERRED EMBODIMENT

To optimize the very rapid reactor water treatment process of the invention, a series of experimental designs were applied to raw process water having waterjet-produced particles in an attempt to first find a suitable combination of coagulant and flocculant. The chemical test screens involved the application of plus 3 aluminum (aluminum sulfate), plus 3 iron (ferric chloride and ferric sulfate) and several anionic and cationic polymers. All these products are known chemical coagulants.

Figure 2:
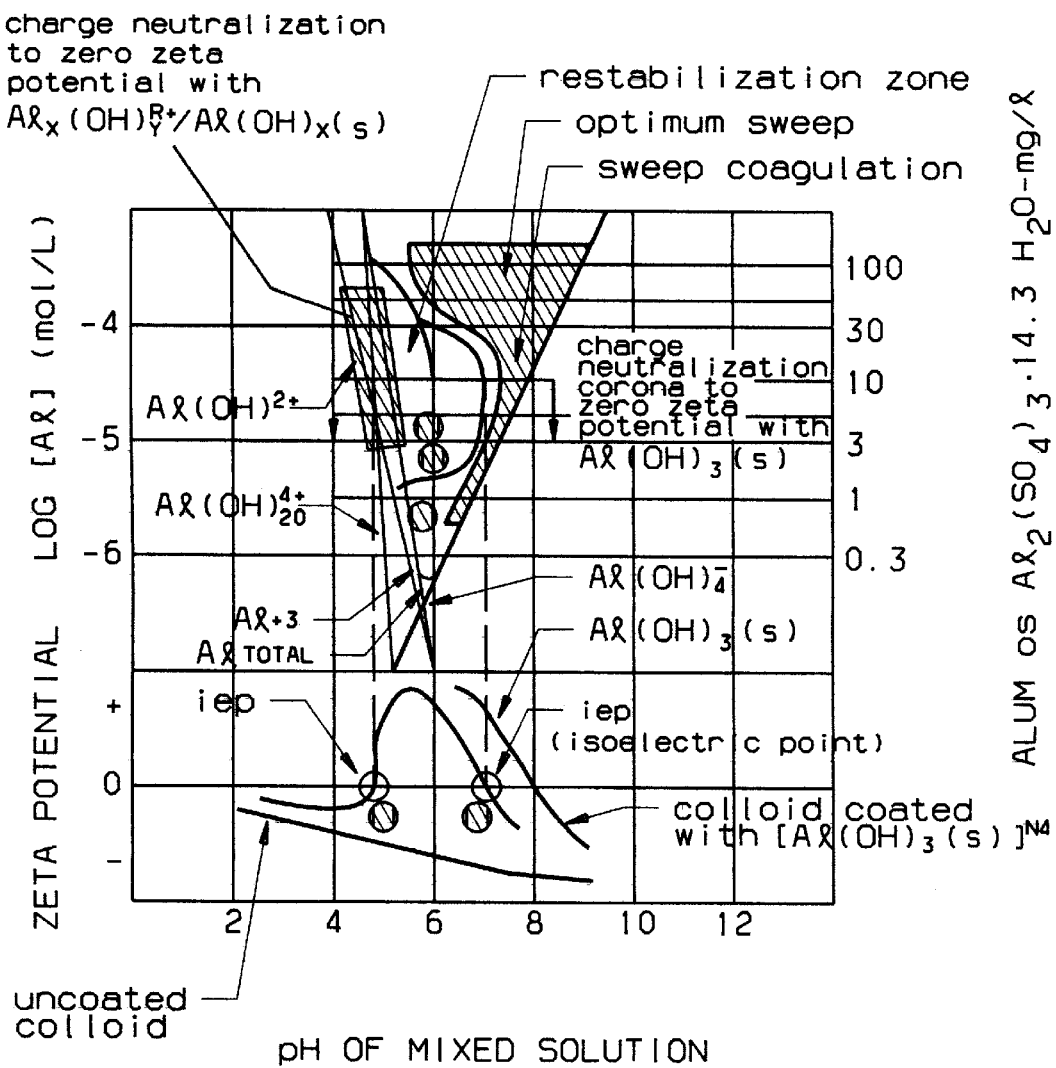
FIG. 2 is a graph depicting known classic pH treatment coagulation ranges.

In association with the coagulants, a variety of anionic (minus charged) and cationic (plus charged) flocculants were tested. The impact of treatment and final treated water pH was also studied. There are recommended ranges for classic coagulant-flocculation chemistries and they are seen in FIG. 2. The goal of the bench laboratory work was to optimize the chemical combinations and ranges for the waterjet type polluted reactor water.

The best performing coagulant and flocculant combination was determined to be an aluminum sulfate solution from BetzDearborn called CP-1301 and a Betz (anionic flocculant) product called AP-1100. The pH range for treatment was about 5 with a final pH of between 6.2 and 7.2, which was further optimized to between 6.8 and 7.2. The initial work involved both sodium hydroxide and/or sodium carbonate as ph modifiers this was not only to keep the ph in a convenient range but to optimize coagulation and flocculation. This need for optimization is best seen in the FIG. 2 classic treatment coagulation ranges.

In order to keep the overall pH's within the needed range, an alkalinity booster was used. Initially, sodium hydroxide was applied due to cost and ease of use. Later, due to the need to do everything possible to get a faster reaction, heavier flock, sodium carbonate was used. This change helped, but was not "the" solution to the lack of reaction time combined with the restriction on using typical plate and frame or vacuum filter presses.

The goal was to provide a rapid process reaction with settling times limited to well under a minute and more in the range of seconds. The initial impact on this quickly treated water was that the back-washable filters (all under evaluation) could not without help: (1) Remove the very small unreacted particles and (2) Defend themselves against the naturally sticky colloid-silica flocks. If the filter was fine enough to catch the remaining very small particles, the filter would not back wash. This impact was true for every known precoated filter, until the final combination of a specific filter, namely the Johnson filter, and a precoat was discovered.

It should be noted that with or without the use of flocculating agents, coagulation produces sticky flocks. Over a substantial time period, days and weeks, fully coagulated flocculated silica turbidity particles became less sticky as they age and oxidize and are easier to filter using back-washable filters.

Initial testing focused on "non-precoated" filters because of the concern about adding additional waste. A significant amount of testing was carried out with four different back-wash filter designs. If the filter was able to reduce the total suspended solids (TSS) flowing to the polishing filters, it could not be back-washed repeatedly. And, if the filter was back-washable it would permit greater than 100 ppm of down-field solids on the polishing filters, which was completely unacceptable. Finally, pre-coating had to be evaluated.

Because of the un-precoated results noted and the inherent stickiness problem of the flocculated solids, as well as the need to capture unflocked, reaction time sensitive, very small particles, the concept of precoating the filter was initiated.

Precoating was attempted on several filters designs using five different precoats at a variety of precoat levels. Some immediate filtering-backwash improvement was noted. However, none of the combinations of filter and precoat proved adequate. A filter would produce water that contained so much TSS that the radioactivity of down-field filters would be seriously raised as well as resulting in too many waste filters; or, it produced satisfactory, if not excellent water, but still would not back-wash reliably.

Finally, it was discovered that using a stainless steel surface filter, based on Johnson Screen, at ~20 to ~25 microns, with a precoat of a particular range of thickness provided the desired results. The precoat used was an expanded volcanic ash called PERLITE which produced the needed and unexpected results. However, other precoats such as diatomaceous earths and crushed garnet could also be used. The key found was to use a stainless steel filter with a precoat.

A specific study was performed using several precoat types and level in combination with the Johnson Screen 20 micron filter. The Johnson Screen/PERLITE combination produced water that contained less than 1 ppm total suspended solids (non-detect) and light transmission that was nearly as good as 0.2 micron filtering. Further, the filter body back-washed successfully and repeatedly. The final filtered Zeta potential of the waster was ~+5.

Due to the inherent rapid treatment requirements of under one minute, floc stickiness, plus the remaining fine, unreacted small particles, the time in between back-washes was 30 minutes minimum and the average cycle time is more than 5 times this value. The backwashing was done at a pressure differential of about 30 pounds. The average flux under these conditions was about 2 gallons per minute per square foot of precoated stainless steel filter surface.

The final process design provided minimum life cycle costs and maximum waste contained in each disposal package with an minimal chemical additions. It also simplified the chemical addition controls. It further provided absolute minimization of down-field filter capture of "total suspended solids" and of down-field filter radiation capture. Also provided were minimal cation and anions in the water which could impact the mixed bed resins while optimizing and minimizing filter pre-coat mass applied to the Johnson Screens and minimize the time between treatment and filtration.

Figure 1:
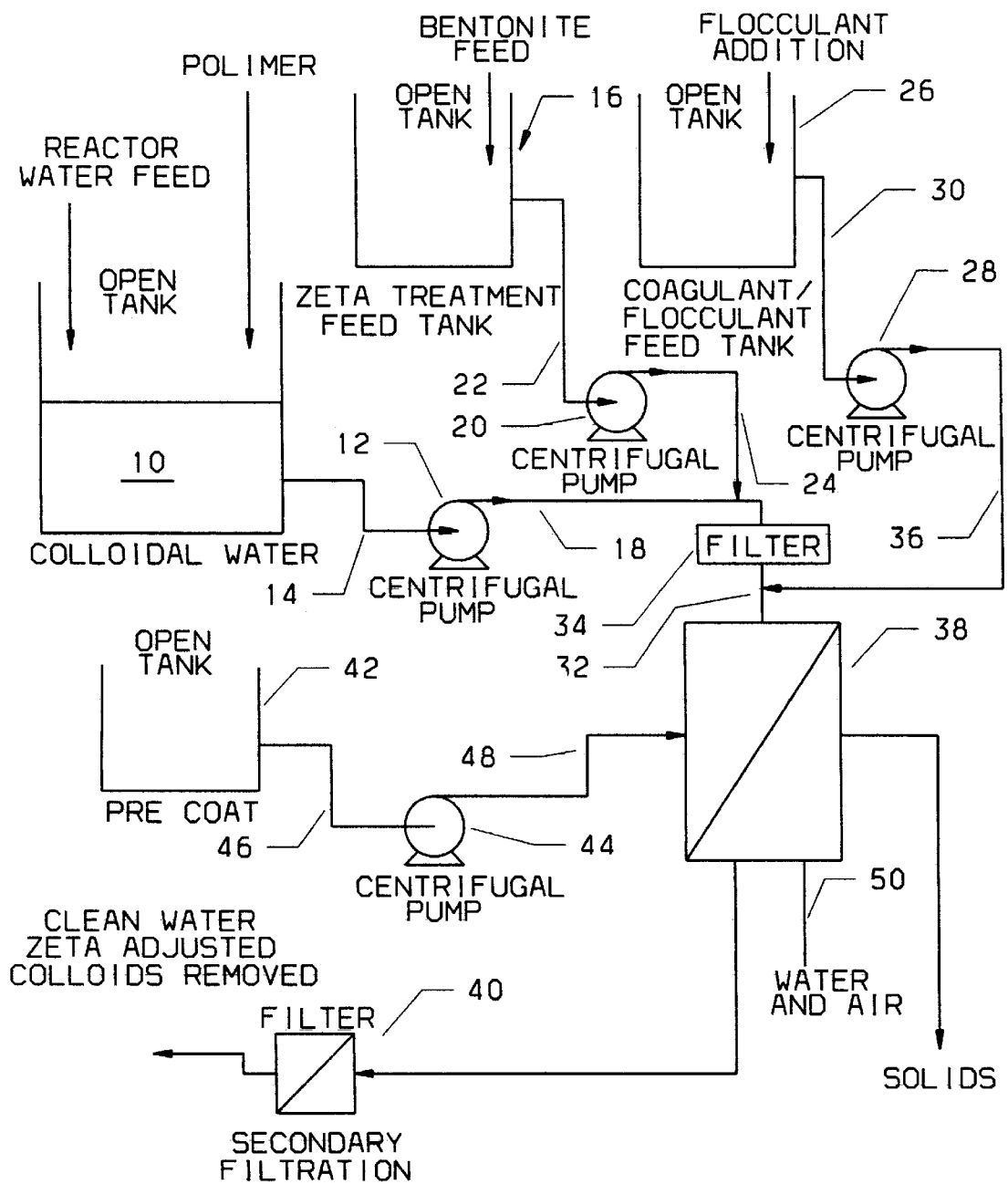
FIG. 1 is a schematic of the optimized reactor water treatment process of the present invention.

Referring to FIG. 1, the optimized process, as a first stage, takes water from a nuclear reactor (not shown) containing suspended particles and colloidal contamination from the previously described garnet waterjet operation and feeds it to a tank (10) and through the process at 1,000 gpm. A flow of 1,000 gal/min flow rate from the tank (10) is maintained by a centrifugal pump (12) connected to the tank (10) by a line (14).

To simplify the process the +3 valent salt was replaced with a cationic (+) polymer. Based on the relatively stable pH band anticipated in the actual process, and due to the wide applicability of the cationic polymers studied, it was determined that there was no need for a pH control additive; nor did cationic polymer treatment require one. This is unlike the tri valent metal approach which initially drives down the water's ph and requires that it be returned to a satisfactory level before final treatment and filtration. The actual use of cationic polymer application combined with a precoat filter still did not meet the high standards of our defined -process when the TSS levels were very high (about >100 ppm). When levels of polymer were increased, there was a diminishing return due to the very quick reaction time required, the increased polymer resulted in to much "glue" on the filter which would not backwash after a cycle. This problem was solved by adding Bentonite. This seeded the water with some immediately available coagulation sites. However, Bentonite has a negative (bad) Zeta on the water and required the correct addition order of polymer and Bentonite.

As seen in FIG. 1, the process feed a dilute slurry of Wyoming sodium bentonite into the reactor water which was mixed in the tank (10) with polymer to have a polymer content of 1–1.5 ppm This provides the proper order of polymer and bentonite injection since it was found that a reversal of this order the down-field filters were plugged.

The level of bentonite injection is fixed at 20 parts per million of bentonite for high TSS levels. For TSS levels of ~30 ppm the use of polymer may be reduced to 0.20 ppm and often to 0.05 ppm the use of bentonite may also be reduced or put on stand by. Under these low level TSS conditions (>100 ppm), the addition level of polymer and the use of bentonite are controlled by Zeta monitoring and light transmission of the process return water.

The bentonite is contained in an open tank, (16) and is feed into the exhaust line (18) of pump (12) by centrifugal pump (20) connected to the tank (16) by line (22) and to line (18) by line (24). Bentonite is from the smectite family of clays. Montmorillonite or sodium bentonite also called Wyoming bentonite are among smectite clays. These clays are crystalline, quartz which itself is a silica. This material is used in a great variety of ways including water treatment, cosmetics, food stuffs and solid stabilization, to name a few.

Bentonite is a safe, non-toxic, non-hazardous material having a large surface area per particle and is able to absorb water, cations, anions, organics (to some degree). It is made up of octahedral sheets which allows the adsorption property. It has a general approximate formula of: $Na_{0.3}Al_{0.7}Mg_{0.3}Si_1O_{10}(OH)_2$ and supplies a small amount of alkalinity to the process water with a rise in pH into the 7–8 range with an addition of ~10–20 ppm. It also provides mild coagulation capability by adsorption and absorption of charged particles and through the presence of electric charge distribution on the clay particles. The material used is called FRAMACHEM™20 (FC-20).

The above-described process of injecting the raw water with these coagulation/agglomeration clay sites causes many small colloids to be electrically and physically attached to the larger clay bentonite particles.

An alternate fine particle catcher that can be added to ad and absorb particles is fine powdered activated carbon. It is usually more efficient than bentonite for many chemical entities. However, it is much more expensive, more difficult to handle and feed and is usually much more difficult to filter from the process water.

In the next stage of the process a flocculation agent is added to a second tank (26) and is inputted into the system by a centrifugal pump (28) connected to the tank (26) by line (30) and to a system line (32) downstream of a filter (34) by exhaust line 36.

Due to the extreme rapidity with which the raw water passes through the system before it reaches filtration, the coagulation process requires some help to remove the negative colloidal charge on the particles so that the smallest particles have a chance to agglomerate, thereby allowing back-washable filtration. This is accomplished through the use of a BetzDearborn product called CP-1601 and referred to as FRAMACHEM™310 (FC-310). This is a very large organic molecule (molecular weight >100,000) that contains nitrogen, carbon, hydrogen, and oxygen. It bears a positive charge at one end of each molecule.

This flocculating agent is added in a 0.2% by weight water solution and makes the product slightly acidic (about pH 4). The product helps bind colloid/clay particles together in large clumps. The negative Zeta potential of the water, after filtration without this agent shows that the chemical is tying up the smallest of the colloids, thus eliminating the Zeta potential associated with them.

The total amount of FC-310 added is 1 part per million with 1.5 ppm required when vacuuming and very high solids levels are present in the water.

In the third stage of the process PERLITE precoat is used to pre-oat the stainless steel Johnson-Screen filter (32). PERLITE precoat material, FRAMACHEM™ 10, was found to be extremely powerful for this application. This product has a bulk density of only about 7 pounds per cubic foot and therefore when wetted it occupies very little space.

When 100 mls of the dry PERLITE is mixed with 100 mls of water only about a 1% expansion in total volume is seen. PERLITE minimizes the addition of weight to the final disposal packages. Inorganic, volcanic ash, that has been heated in the presence of a trace of water yielding a very high surface area, low bulk density material. The supplier of the PERLITE used in Silbrico, Grade 17S.

Nearly no volume or mass expansion results due to the use of PERLITE. Perlite serves as a very efficient filtering medium due to very high surface area per gram. It protects the stainless steel filter surface from stickiness permitting good backwash ability and permits excellent de-waterability of the back-washed precoat-sludge mixture. The range of precoat coverage was found to be effective when used in the range of 75 mls/square foot-300 mls/square foot depending on the how dirty the reactor water had become.

The Johnson-Screen filter (32) is a sturdy stainless steel mesh tube. The finest mesh size currently available is about 700 mesh or ~20–25 microns. From earlier work, this was a compromise filter pore size that allowed good filtration (with pre-coat) without plugging and slowly eliminating back-washability.

Johnson-Screen is manufactured for filter manufacturing companies or supplies tubes alone from US Filter, Inc. it comes as a stainless steel tube with shinny, hard surface, with ~20 micron tapered "tunnels" cut in the surface. The mentioned mesh allows precoat entry in the filtering "tunnels". Pre-coat also coats the entire surface of the filter to a depth of a few millimeters protecting the surface from the sticky floc. Water and air are used to backwash the materials off the surface from inside the tubes out in a manner well known in this area. A flux can be maintained at about 2 gls per square foot for about 45 minutes with a maximum pressure drop of about 75–100 psi (estimated). The Johnson-Screen filter tubes are rated at 150 psi. Any form of pleated filter tube design did not work well and would not allow continuing back-wash without significant plugging after few cycles.

After the treated water leaves the backwash filter, it passes through a 2–3 micron 3M pleated fabric filter (34) and then through a 0.5 micron final polishing filter (40). Even through pilot test results have shown that the treated water using the Johnson-Johnson Screen system passes literally no solids, there could be upsets where solids could pass. An example would be a "re-coating" of the Johnson Screen with PERLITE that was uneven. In this event some TSS might move down-field to the polishing filters. The 3M filters have shown themselves to be very robust and excellent filters of "charge neutralized" water.

An open tank (42) containing a controlled feed of PERLITE precoated is connected to the filter (38) by a centrifugal pump (44), which is connected to the precoat tube (42) by line (46) and the filter (38) by line (48).

The goals of the secondary treatment and solids removal system have been explained. The final step, after proper treatment, filtration and then removal of them from the filtering screens is to provide a surge of high pressure water with air inputted into the filter (38) along line (50) used to move the sludge collected at the bottom of the filter (38) along a line (52) to the collection vessels (not shown). The presence of the PERLITE mixed with the treatment sludge aids in the reduction of stickiness and experiments have indicated that the sludge will move smoothly and rapidly along line (52) into collection vessels. Further work with the sludge alone and then with PERLITE mixed in shows a very substantial enhancement in dewaterability. The final sludge after gravity dewatering will have a bulk density of between 64–68 pounds per cubic foot. Free, entrained water, will rise to the top of the collection vessel for decanting a second method of removing water from the sludge once it is in the waste package.

The previously discussed stages separated the bulk (>99%) of the solids from the water. The balance of the solids will be removed with cartridge filtration. A 2 micron cartridge filter in a pressure vessel (referred to as a Sludge Collection Filter (SCF) is provided downstream of the BWF effluent. The BWF with precoat will remove 2 micron particles. However, in case precoat material is applied unevenly or a breakthrough in the BWF occurs, the SCF provides "defense in depth". The effluent from the SCF filters is pumped through the final polishing filter (40) containing ½ micron filters. The polishing filters are not expected to remove much solids. The treatment process and precoat BWF are expected to bind the submicron particles and remove said particles. However, it is believed to be advantageous to capture any submicron particles that escape the bulk separation process prior to release to the cavity.

It will be understood that certain details as well as alternate embodiments and apparatus have been deleted herein for the sake of conciseness and readability but are fully intended to fall within the scope of the following claims

We claim:

1. A method of rapid removal of colloidal suspensions formed in reactor water during high energy waterjet cutting with particulate material which produces colloidal particles in the reactor water from fractured cutting particulate material and cut metal fines from the reactor comprising the steps of:

feeding the reactor water to a multi step process at a flow rate in the range of 1,000 gallons per minute;

adding a chemical coagulant to the reactor water to coagulate said colloidal particles;

adding a smectite clay material to the reactor water for providing alkalinity and added coagulation of said colloidal particles;

adding a flocculant material to the reactor water to provide charge neutralization and flocculation of said colloidal particles; and filtering the reactor water through a stainless steel mesh filter of approximately 20–25 micron mesh size to remove the flocculated colloidal particles.

2. A method of rapid removal of colloidal suspensions in reactor water subjected to waterjet cutting as set forth in claim 1 including the step of backwashing the filter with water at approximately 20 psi pressure differential for approximately not more than 30 minutes.

3. A method of rapid removal of colloidal suspensions in reactor water subjected to waterjet cutting as set forth in claim 2 including the backwashing of water at a rate of approximately 2 gal/min/square foot of filter area.

4. A method of rapid removal of colloidal suspensions in reactor water subjected to waterjet cutting as set forth in claim 1 wherein the filter is coated with a volcanic ash precoat material to provide back-wash reliability.

5. A method of rapid removal of colloidal suspensions in reactor water subjected to waterjet cutting as set forth in claim 4 including the steps of backwashing the filter with water at an average cycle time of 150 minutes.

6. A method of rapid removal of colloidal suspensions in reactor water subjected to waterjet cutting as set forth in claim 1 including the steps of further filtering the reactor water with a second screen filter and adding a precoat material thereto to help with the sludge removal there from.

7. A method of rapid removal of colloidal suspensions in reactor water subjected to waterjet cutting as set forth in claim 1 wherein the smectite clay material is bentonite.

8. A method of rapid removal of colloidal suspensions in reactor water subjected to waterjet cutting as set forth in claim 7 wherein said flocculant material is an anionic flocculant and including the step of adding a metal coagulant.

9. A method of rapid removal of colloidal suspensions in reactor water subjected to waterjet cutting as set forth in claim 7 wherein said flocculant material is a cationic flocculant and including the step of adding a metal coagulant.

10. A method of rapid removal of colloidal suspensions in reactor water subjected to waterjet cutting as set forth in claim 7 wherein the flocculant is a water solution in the range of 0.05 to 1.5% by weight of organic molecules having a positive charge.

11. A method of rapid removal of colloidal suspensions in reactor water subjected to waterjet cutting as set forth in claim 10 wherein the flocculant is added to the reactor water in the range of 0.05–1.5%.

* * * * *